United States Patent [19]

Klem

[11] Patent Number: 4,573,702
[45] Date of Patent: * Mar. 4, 1986

[54] ANTI-PITCH SUSPENSION

[76] Inventor: Richard H. Klem, 35 N. Highland St., Arlington, Va. 22201

[*] Notice: The portion of the term of this patent subsequent to Nov. 27, 2001 has been disclaimed.

[21] Appl. No.: 428,922

[22] Filed: Sep. 30, 1982

Related U.S. Application Data

[63] Continuation-in-part of Ser. No. 361,534, Mar. 23, 1982, Pat. No. 4,484,767.

[51] Int. Cl.4 ............................................. B60G 3/00
[52] U.S. Cl. ..................................... 280/697; 280/703
[58] Field of Search ..................... 280/96.1, 660, 668, 280/673, 675, 688, 690, 697, 701, 703, 724, 726

[56] References Cited

U.S. PATENT DOCUMENTS

| | | | |
|---|---|---|---|
| 2,954,237 | 9/1960 | Sampietro | 280/703 |
| 3,151,877 | 10/1964 | Bajer | 280/673 |
| 3,591,198 | 7/1971 | Brando | 280/697 |

Primary Examiner—Joseph F. Peters, Jr.
Assistant Examiner—Ross Weaver
Attorney, Agent, or Firm—Douglas B. Farrow

[57] ABSTRACT

A vehicle suspension is designed to utilize lateral movement of the body of the vehicle relative to the wheels in order to control the sway or roll of the vehicle body relative to the ground. Several systems are disclosed for translating the roll tendency of the body into lateral movement of the body relative to the wheels without body roll. This system may be also used to control other suspension parameters such as ride height, spring rates, caster, camber, and toe-in. The system is also effective in reducing the load sensitivity of the suspension to understeer or oversteer. The principle of the invention may also be used to control dive during braking or squat during acceleration.

7 Claims, 8 Drawing Figures

ANTI-PITCH SUSPENSION

RELATED APPLICATIONS

This application is a continuation-in-part of my application, Ser. No. 361,534, filed Mar. 23, 1982 now U.S. Pat. No. 4,484,767.

BACKGROUND OF THE INVENTION

Over the years, the roll of a vehicle such as an automobile about its longitudinal axis has always been considered a problem to a greater or lesser extent. Particularly on more softly suspended vehicles, this roll can become quite disconcerting to a passenger and adversely effect handling. A number of attempts have been made at reducing or eliminating roll, the most common and preferable of which is the use of antiroll or antisway bars. Such bars have a tendency to reduce the amount of sway, and while such bars typically have no effect on bumps affecting both wheels of an axle, the stiffer the sway bar gets, the more ride quality is compromised on one wheel to a suspension movement or deflection at the other wheel. The use of a complicated frame and system to allow a car body to bank into the turn about an axis above the body center of gravity has also been attempted as typified in U.S. Pat. No. 2,234,676. Any number of other systems have been produced which prevent roll of the vehicle body relative to the wheels such as U.S. Pat. No. 2,770,468. None of the systems known, however, have utilized lateral translational movement of the body relative to the wheels to resist roll. Any lateral compliances which may exist in presently known systems are placed there only for the purpose of ride comfort in absorbing shocks and vibrations transmitted through the wheels. The use of compliance for that reason is demonstrated in U.S. Pat. No. 2,309,811. None of the known systems utilizes lateral translational movement of the body center of gravity to reduce roll.

SUMMARY OF THE INVENTION

It is the object of this invention to produce a suspension system which is capable of eliminating or reducing body roll. If desired, the system may even be utilized to allow banking of the vehicle body toward the inside of a turn. As used hereinafter the terms inner and outer refer to the direction in which the vehicle is turning and the opposite direction, respectively. These results may be accomplished by providing means for the lateral forces on the vehicle during cornering to produce lateral translational movement of the vehicle body relative to the wheels and wheel supporting means, and utilizing such movement to control body roll. The supporting means may either be a beam axle in the case of a solid axle car or may be a-arms, MacPherson strut or any other conventional suspension pieces which may be used to yield an independent suspension. A semi-independent suspension may also be obtained with a trailing twist axle as found on GM's X and J bodies, Chrysler's L and K cars, and Volkswagon Rabbit. While the normal tendency of the vehicle during roll is to increase the compression of the outer spring and to reduce compression or even extend the inner spring, the instant invention is intended to create an additional means of providing that compression and extension by utilizing the lateral translational movement of the vehicle. The springs (including but not limited to leaf, coil, gas or rubber) may be mounted at any angle relative to the lateral movement of the wheel supporting means so that lateral movement increases compression of the outer spring and reduces compression or extends the inner spring directly. Alternatively, springs of various types including antisway bars may be mounted via a linkage which may be mechanical or hydraulic. This linkage operates as a jacking system which effectively converts the lateral translational movement of the body relative to the wheel locating means into a mechanical compression and extension of the springs either by way of hydraulic cylinders or by way of a mechanical jacking system. The jacking is an increased compression of the outside spring and decreased compression of the inside spring. The mechanical jacking system which is utilized may be formed with solid link pieces or may utilize a cable arrangement. Such linkage may be no more than a simple diagonal link piece.

The principal of the instant invention may also be utilized to provide a suspension system with anti-dive and anti-squat capabilities. Towards this end, movement of the wheel is allowed in a fore-aft plane and the springing medium is mounted at an angle from front to rear and allowed to pivot such that upon braking, the spring's lower end moves rearwardly thereby increasing compression of the spring while at the same time effectively lengthening the vertical length of the spring.

These and other objects and advantages of my invention will appear more fully from the following description made in conjunction with the accompanying drawings wherein like reference characters refer to the same or similar parts throughout the several views.

DESCRIPTION OF THE PREFERRED EMBODIMENT

Figure 1:
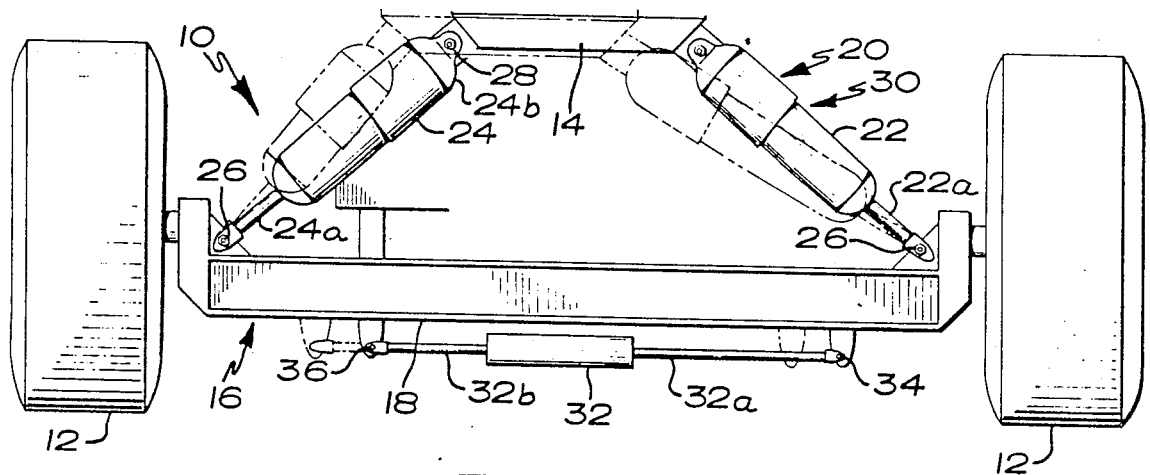
FIG. 1 is a longitudinal plan view of the instant invention.

FIG. 1 discloses an antiroll suspension 10 which is generally used for suspending a vehicle having wheels 12 from a body 14. It is understood of course that the term body 14 is used in a general nature and may include situations where the frame is integral with the body or wherein a separate frame per se is present. A wheel supporting means 16 is in the case of the embodiment of FIG. 1 comprised essentially of a beam or rigid axle 18. Wheel supporting means 16 is used to rotatably mount wheels 12 thereon. As will be seen more fully hereinafter, wheel supporting means 16 may also allow for an independent suspension and may generally be characterized as the portion of the suspension which in conjunction with wheels 12 moves laterally relative to body 14. Body 14 is suspended from wheel supporting means 16 by suspending means 20. Suspending means 20 are comprised of inner and outer spring means 22 and 24, respectively. Spring means 22 and 24 may be coil, gas, or other conventional springing media. As shown in the drawing figures, the vehicle, when in the cornering position shown in phantom, is cornering in the direction of the right side of each figure with the right spring means 22 being designated the inner spring means and the spring on the left being designated the outer spring means 24. Of course if the vehicle were to corner in the opposite direction this notation would be reversed. Spring means 22 and 24 each have first ends 22a and 24a attached pivotably to attachment points 26 on axle 18 adjacent wheels 12. Spring means 22 and 24 also have second ends 22b and 24b pivotably attached to chassis pickups 28 to body 14. As can be seen in FIG. 1, spring means 22 and 24 angle upwardly and toward each other from attachment points 26. In this embodiment, it is essentially the mounting angle of spring means 22 and 24 which act as the means for translating the lateral inertia of the vehicle and particularly vehicle body 14 into lateral movement of body 14 relative to wheel supporting means 16 and which converts such movement into increased compression of outer spring means 24 and decreased compression of inner spring means 22 compared to a more conventional suspension system. This movement may be seen in the phantom in FIG. 1 and shows the jacking effect. As can be seen, depending upon the spring rates, angle of mounting, and the like, sway may be absolutely controlled to whatever degree desired and other suspension parameters such as ride height may also be controlled. Also part of suspending means 20 may be optionally a lateral shock absorber 32. In general lateral shock absorber 32 may be tuned so as to prevent high frequency lateral movement of supporting means 16 relative to body 14 during bumps and other such high frequency movements while at the same time allowing lateral movement during cornering which is considered relatively low in frequency. In the particular configuration shown in FIG. 1, lateral shock absorber 32 has first and second ends 32a and 32b, respectively. First end 32a attached to axle 18 at attachment point 34 while second end 32b is attached to body 14 at attachment point 36. As shown in FIG. 1, attachment point 34 is located below attachment points 26. This set up gives the effect of providing different roll centers during cornering and during high frequency movements such as bumps, a lower roll center being desirable in the bump mode than in the cornering mode. It is to be stressed that the lateral movement taking place between body 14 and supporting means 16 is primarily translational in nature and is not to be confused with banking or sway present in prior suspension systems. It is in fact desired in most conventional systems that lateral movement not take place.

Figure 2:
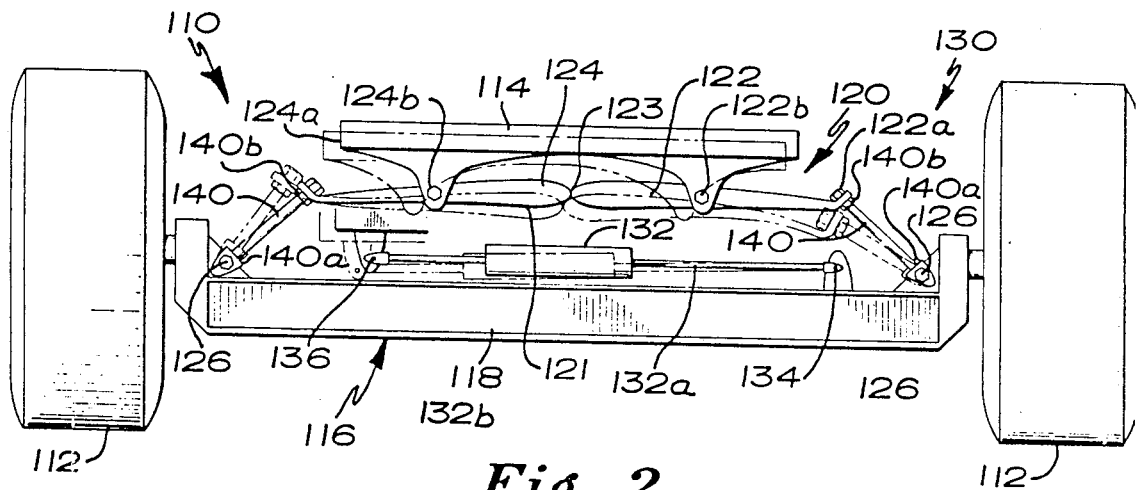
FIG. 2 is a longitudinal plan view of an alternate embodiment.

Turning to the embodiment shown in FIG. 2, the FIG. 2 embodiment utilizes a leaf spring 121. Inner and outer portions 122 and 124 of leaf spring 121 act in much the same way as the spring means 22 and 24 do in the FIG. 1 embodiment. Where possible, parallel numbers have been used to describe the various embodiments. In this embodiment link 140 acts as a simple form of linkage jacking system. Such a link may also be used with other types of springs such as antisway bars. Wheels 112 are mounted to wheel supporting means 116 which is comprised of an axle 118. Supporting means 116 is mounted to body 114 by suspending means 120 which is comprised of a lateral shock absorber 132 and translating means 130. Translating means 130 is in turn comprised of leaf spring 121 and links 140. Leaf spring 121 has a region of increased flexibility 123 intermediate chassis pickups 122b and 124b. Spring 121 has first and second sides 122 and 124 which are the inner and outer spring means, respectively. Inner spring end 122a has mounted thereto second end 140b of one of links 140. The other end 140a of the link 140 is attached to axle 118 and at attachment point 126. The other link 140 is attached at its upper end 140b to leaf spring 121 second end 124a. The other end of 140a of the other link 140 is attached to the other attachment point 126 on axle 118. Similarly, lateral shock absorber 132 has a first end 132a attached to axle 118 at point 134 and second end 132b attached to body 114 at point 136. In the embodiment shown in FIG. 2 attachment point 134 is approximately even with attachment point 126 thereby yielding no appreciable change in roll center during bump and cornering modes.

Figure 3:
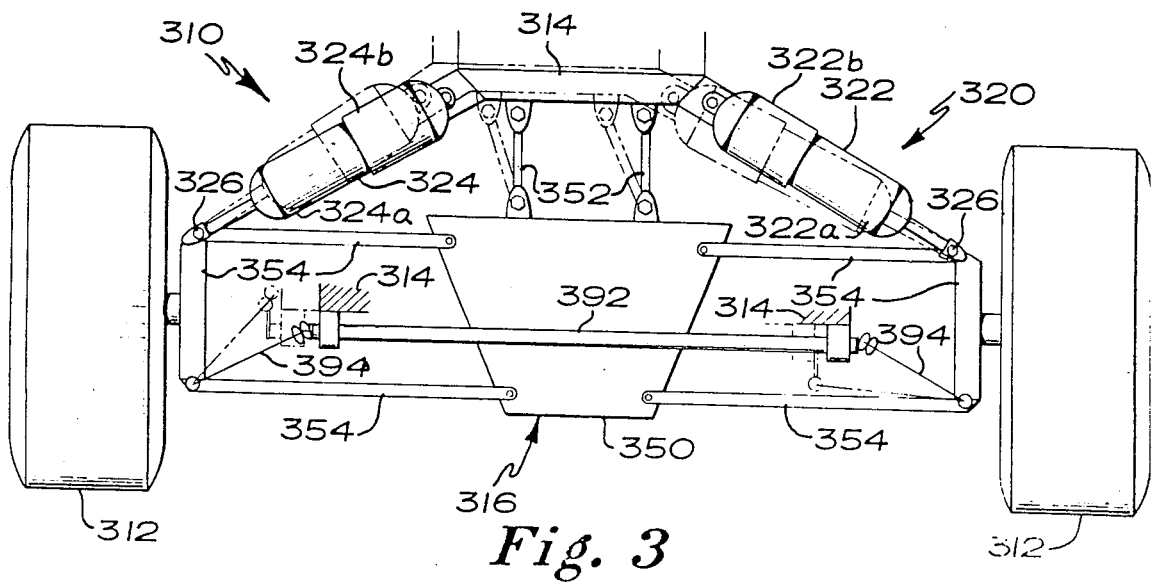
FIG. 3 is a longitudinal plan view of another alternate embodiment.

Turning to the embodiment shown in FIG. 3, it can be seen that this is a variation of the embodiment shown in FIG. 1 adapted so as to allow independent suspending of wheels 312. In particular now wheel supporting means 316 is now comprised of a subframe 350 which is attached to body 314 by means of linkage 352. Linkage 352 is shown in schematic form only and any suitable linkage which allows the lateral motion of subframe 350 relative to body 314 is suitable. Linkage 352 may be arranged so as to allow some rotation of the subframe to control chamber. Attached in turn to subframe 350 are independent mounting means 354 to which are attached wheels 312. As see in FIG. 3, independent mounting means 354 is a double A-arm type of suspension. Of course other conventional independent and semi-independent suspension systems may be utilized to achieve the same result and the use of other such conventional mechanisms is within the contemplation of all embodiments solid axles being shown in the later figure only for simiplicity. Suspension means 320 again comprises inner and outer spring means 322 and 324 which are mounted to independent mounting means 354 at the bottom end thereof in a fashion to that shown in FIG. 1 and which allows independent movement of wheels 312 in the bump mode while retaining the lateral movement of the instant invention and which is shown more fully in FIG. 1. FIG. 3 also shows antisway bar 392 and links 394 such that cornering causes antisway bar 392 and links 394 to act in a manner similar to leaf spring 121 and links 140 in FIG. 2.

Figure 4:
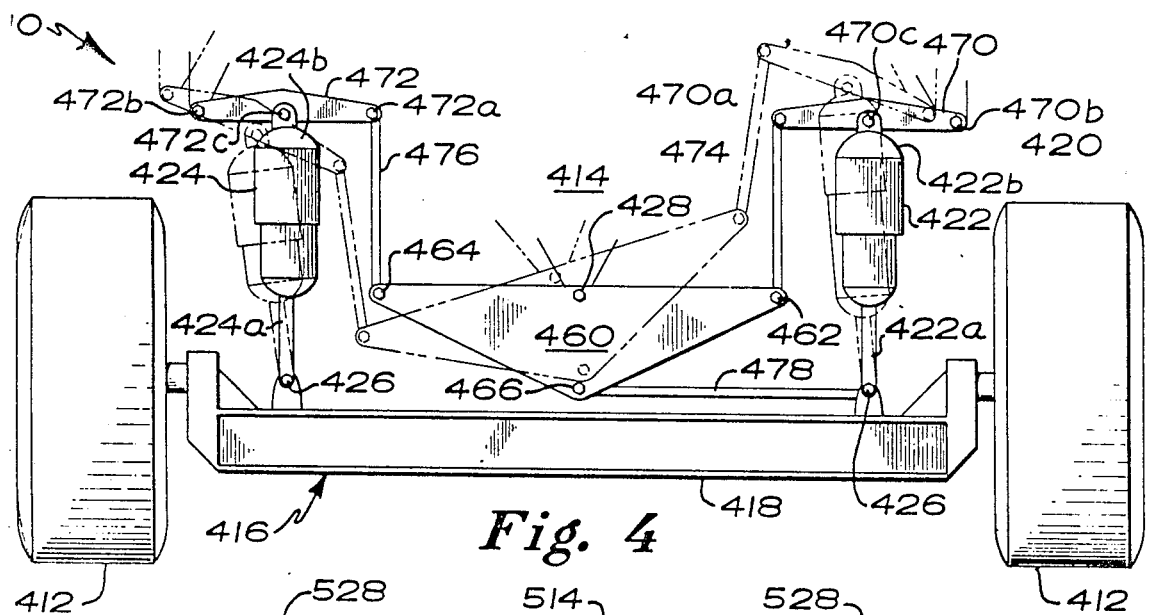
FIG. 4 is a longitudinal plan view of yet another alternate embodiment.

Turning to the embodiment shown in FIG. 4, rocker arms 470 and 472 are used to provide a jacking effect on inner and outer springs 422 and 424, respectively. In particular, upper end 422b of inner spring means 422 is mounted to attachment point 470c of inner rocker arm 470, the outer end of rocker arm 470 is attached at 470a to link 474 while the inner end 470b of rocker arm 470 is attached to body 14. Similarly, outer rocker 472 is attached at inner end 472a to link 476 and at outer end 472b to body 14. The upper end 424b of spring means 424 is attached to rocker 472 at 472c. The lower ends 422a and 424a of springs 422 and 424 are attached to axle 418 at attachment points 426. A bell crank 460 is pivotally mounted to body 414 at chassis pickup 428. Ends 462 and 464 of bell crank 460 are attached to links 474 and 476, respectively. Similarly, link 478 connects bell crank bottom 466 at attachment point 426 on axle 418. As can be seen in FIG. 4 in phantom, the lateral motion of body 414 causes the movement of bell crank 460 providing a jacking effect which increases the compression of outer spring 424 and decreases the compression of inner spring 422. It is to be noted that while FIG. 4 shows the use of solid lengths in a bell crank, it is appreciated that that system may be applied using cables and pulleys as well.

Figure 5:
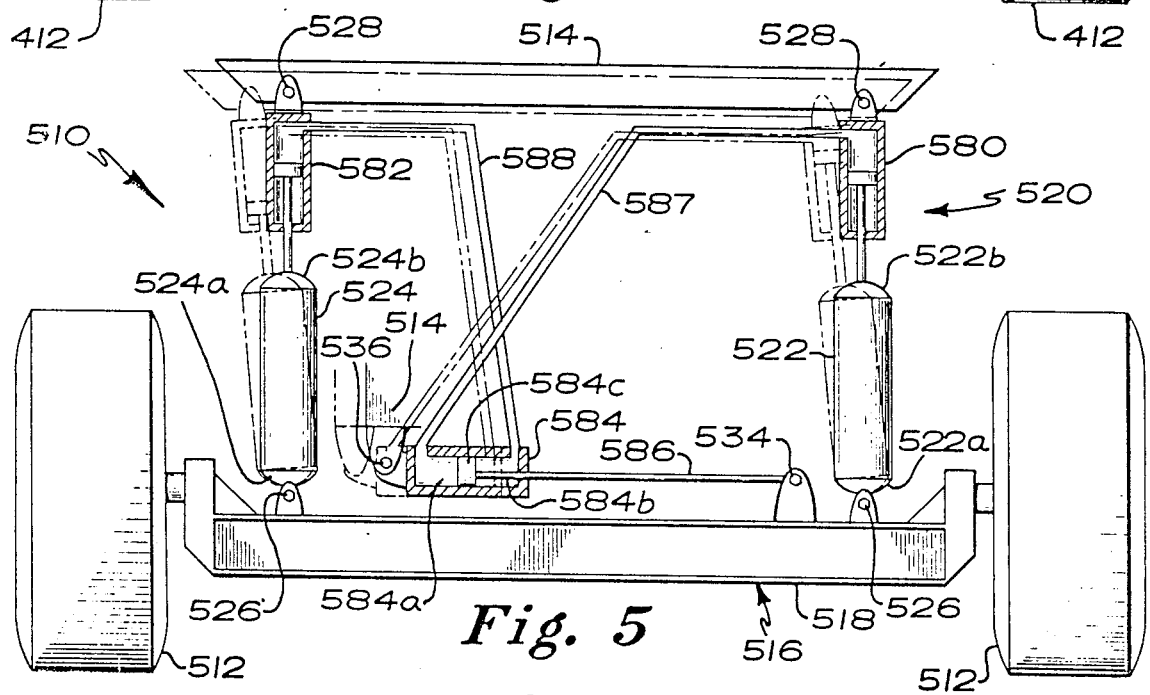
FIG. 5 is a longitudinal plan view of still another alternate embodiment.

The hydraulic equivalent of FIG. 4 is shown in FIG. 5. In particular, FIG. 5 is particularly suited for use with suspension systems already having hydraulic components. While jacking cylinders 580 and 582 are shown separately from and above inner and outer springs 522 and 524, it can be appreciated that these components may be integrated into a single unit or jacking cylinders may be placed between the spring and supporting means if desired. In particular, inner and outer jacking cylinders 580 and 582, respectively, are interposed between chassis pickups 528 and the upper ends 522b and 524b of inner and outer spring means 522 and 524, respectively. A lateral jacking cylinder 584 is mounted at one end to body 514 at its other end to axle 518. Cylinder 584 has a piston 584c therein which is connected to rod 586. First side 584a is connected via line 587 to inner jacking cylinder 580 while lateral jacking cylinder second side 584b is connected via line 588 to outer jacking cylinder 582. As can be seen in the phantom portion of FIG. 5, the jacking effect which takes place in this embodiment is quite similar to the mechanical analogue of FIG. 4.

Figure 6:
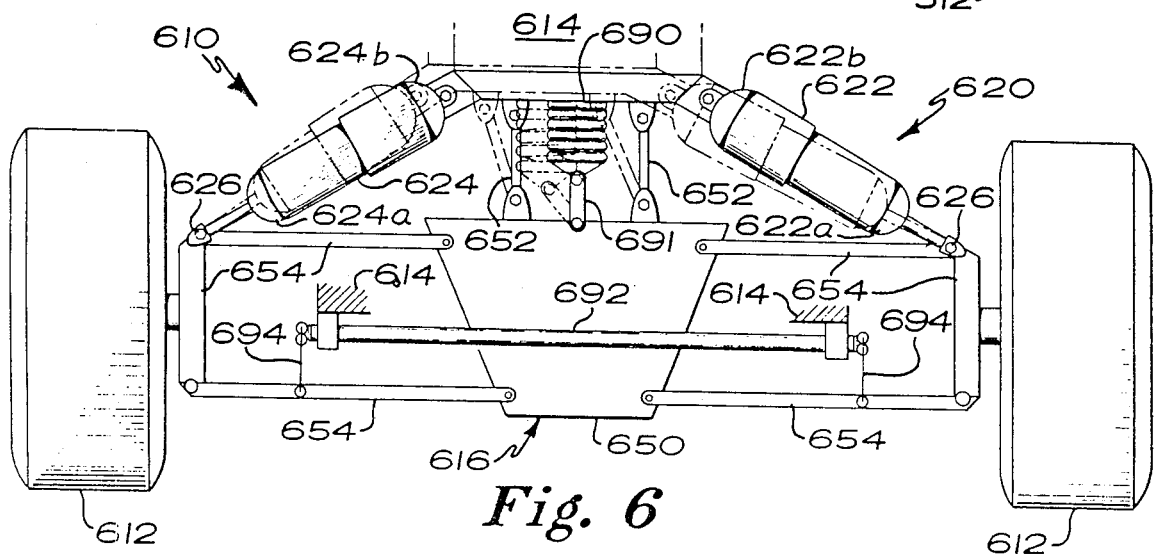
FIG. 6 is a longitudinal plan view of an alternate embodiment.

The embodiment shown in FIG. 6 is similar to that shown in FIG. 3 and utilizes as part of suspending means 620 a toggle spring 690 which provides a downward force on toggle link 691 which is in turn pivotably attached to subframe 650. When entering the cornering mode, toggle spring 690 provides a lateral force increasing the lateral movement of body 614 relative to wheel supporting means 616 and which also serves to increase jacking. A conventional antisway bar 692 is mounted to body 614 and has at either end thereof links 694. Antisways bar 692 serves to eliminate the destabilizing effect of toggle spring 690 that otherwise could cause the body to fail to return to center after moving to the side. Any conventional spring that is not part of the antisway suspension would have this effect.

Figure 7:
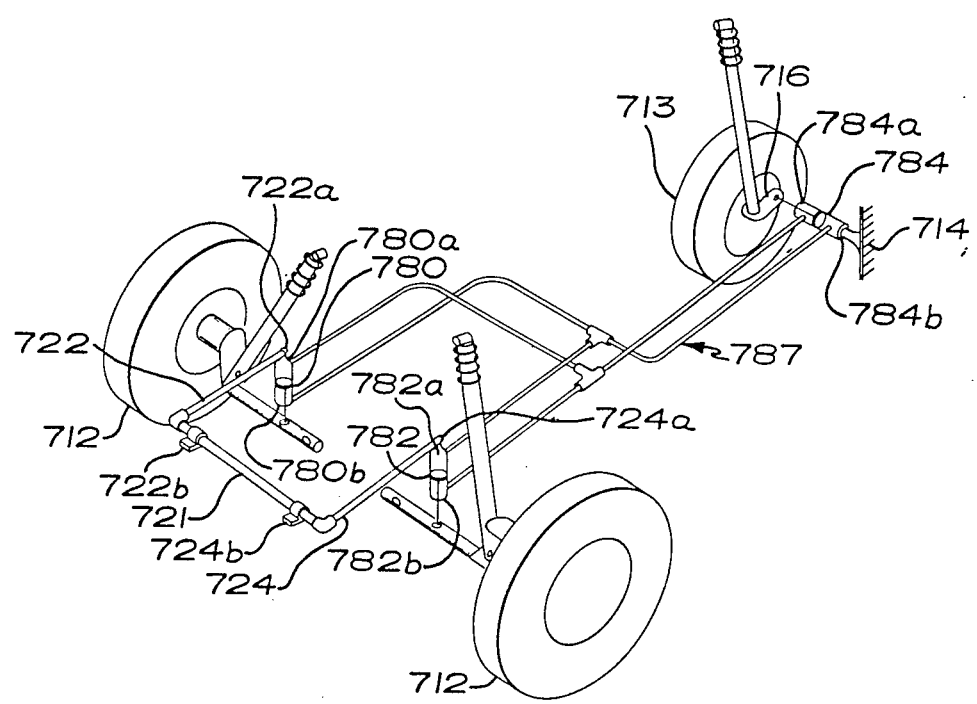
FIG. 7 shows a multiple axle-jacking system.

Turning to FIG. 7 this embodiment is highly suited (but not limited) to front wheel drive cars where the cost and complexity of allowing lateral translational movement of the front wheels could be prohibitive. In particular a rear wheel 713 is mounted to jacking cylinder 784 which translates the inertia of body 714 into lateral movement relative to wheel supporting means 716. At the front body 714 is suspended from jacking cylinders 780 and 782 and spring means 722 and 724 which are portions of antisway bar 721. Jacking cylinders 780, 782, and 784 along with hydraulic lines 787 comprise a system for jacking spring means 722 and 724. In particular the first side 784a of lateral jacking cylinder 784 is connected to the bottom side of 782b of jacking cylinder 782 and the top side 780a of jacking cylinder 780. Correspondingly the second side 784b of jacking cylinder 784 is connected to the top side 782a of jacking cylinder 782 and the bottom side 780b of jacking cylinder 780. This allows lateral movement of the rear wheel to be converted into a jacket effect at the front axle of the vehicle. On a vehicle with more than three wheels, rear spring means could be jacked as well, as desired.

Figure 8:
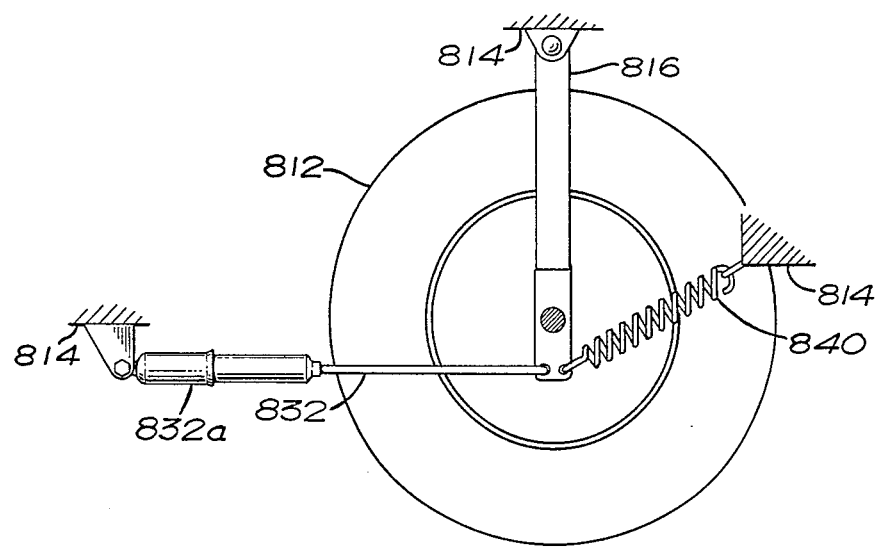
FIG. 8 is a side plan view showing an embodiment having anti-dive capabilities.

FIG. 8 discloses an embodiment which may be applied to yield a suspension having anti-dive and anti-squat characteristics. In particular, the principle of utilizing movement in the suspension is in this case applied in a fore-aft direction. In FIG. 8, the wheel 812 is mounted on a wheel supporting means 816 which may be a MacPherson, strut 816 which is in turn mounted to body structure 814. A spring means 840 is pivotally mounted at its upper end to body structure 814 and its lower end to strut 816. In an anti-dive configuration shown in FIG. 8, spring means 840 angles upwardly and rearwardly. Fore-aft movement is further controlled by a drag strut 832 having a shock absorber 832 mounted therewith. Thus, as the vehicle brakes, wheel 812 and wheel supporting means 816 tend to move rearwardly thereby causing shock absorber 832a to allow some rearward movement thereby jacking the body structure 814 upwardly as spring means 840 is rotated thereby decreasing or eliminating dive during braking. Of course, it may be appreciated that similar geometry may be utilized at the rear of the car to yield anti-squat capabilities.

Of course it can be appreciated that the anti-pitch embodiment of FIG. 8 may be applied in a manner similar to that of FIGS. 1 and 5. In such an application, front and rear axles would be tied together in a manner analogous to the side-to-side tie of the anti-roll embodiment.

While the preferred embodiments of the present invention have been described, it is understood that individual features such as spring type, linkages, wheel supporting and suspending means, etc., may be combined any variety of ways, and in some cases combined with conventional features, and that various changes, adaptations, and modifications have been made therein without departing from the spirit of the invention and the scope of the appended claims.

What is claimed is:

1. An anti-pitch suspension for suspending at least one wheel from a vehicle body, said suspension comprising:
    wheel supporting means, at least one said wheel being mounted to said supporting means;
    spring means associated with at least one said wheel;
    means suspending said body from said wheel supporting means, said suspending means comprising means for translating the fore-aft inertia of said vehicle body during fore-aft acceleration into substantial fore-aft translational movement of said vehicle body relative to said supporting means; and
    means for converting said vehicle body fore-aft translational movement into increased compression of at least one said spring means independent of vertical movement of said wheel due to bumps and other non fore-aft accelerative forces.

2. The anti-pitch suspension of claim 1, said spring means having a first end pivotably attached to said supporting means and a second end pivotably attached to said vehicle body.

3. The anti-pitch suspension of claim 2 wherein said vehicle body comprises:
    at least first and second axles;
    a center between said axles, said spring means angling from said first end towards said center, said second end being closer to said center than said first end.

4. The anti-pitch suspension of claim 3 further comprising means for interconnecting said spring means on said first axle and said spring means on said second axle.

5. The anti-pitch suspension of claim 4 wherein said interconnecting means increases compression of said spring means on said first axle and decreases compression of said spring means on said second axle.

6. An anti-roll suspension for suspending at least one wheel from a vehicle body, said suspension comprising:
  a wheel supporting means, at least one of said wheels being mounted to said supporting means;
  a torsional bar mounted to said vehicle, said bar having at least a first actuating arm; and
  means suspending said body from said wheel supporting means, said suspending means comprising means for translating the lateral inertia of said vehicle body during cornering into lateral translational movement of said vehicle body relative to said supporting means, said translating means comprising at least a first link and said supporting means comprising at least a first attachment point, said first actuating arm being above and toward the center of said vehicle relative to said attachment point, said link connecting said attachment point and said first actuating arm, said link angling upwardly and inwardly from said point to said arm.

7. The suspension of claim 6 wherein said torsion bar is a sway bar.

* * * * *